Dec. 14, 1937.  G. A. LYON  2,102,469
TIRE COVER
Filed Aug. 21, 1933  2 Sheets-Sheet 1
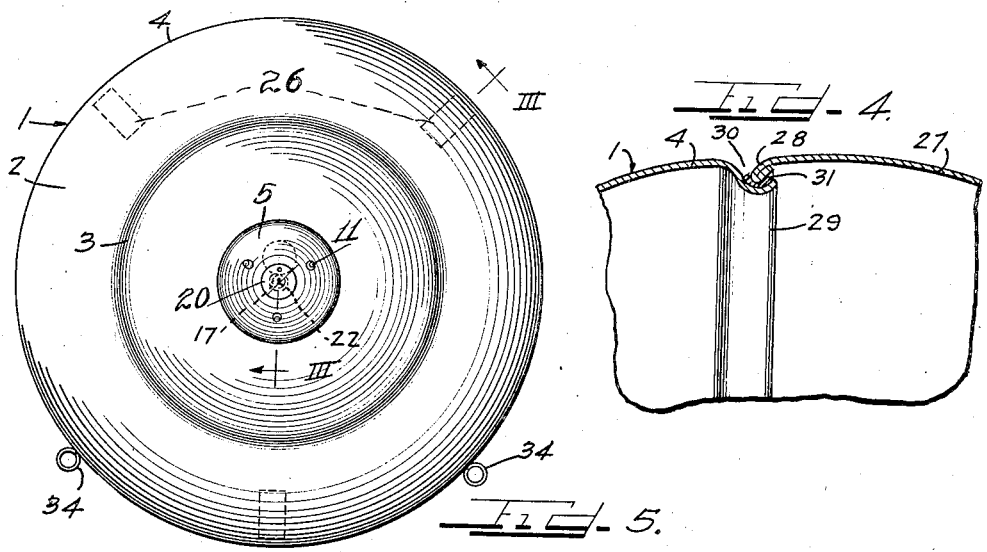
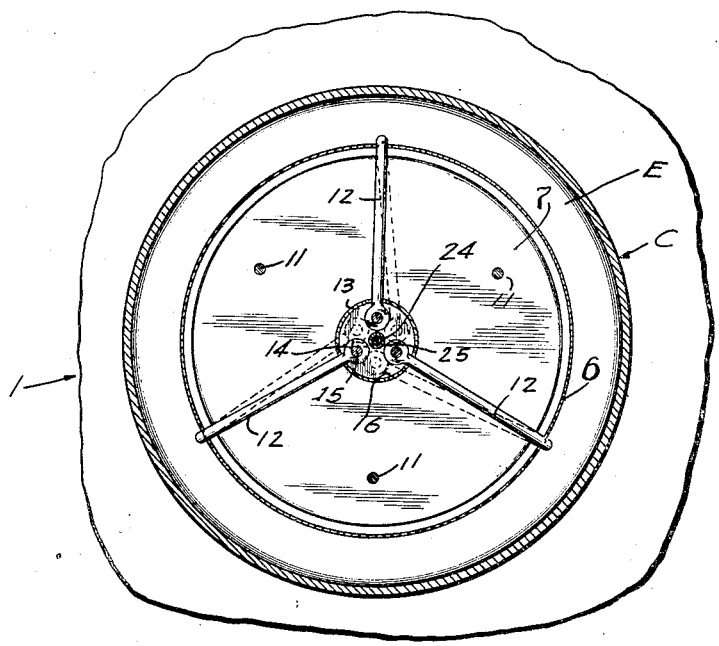
Inventor
GEORGE ALBERT LYON.
by Charles H. Hill Attys.

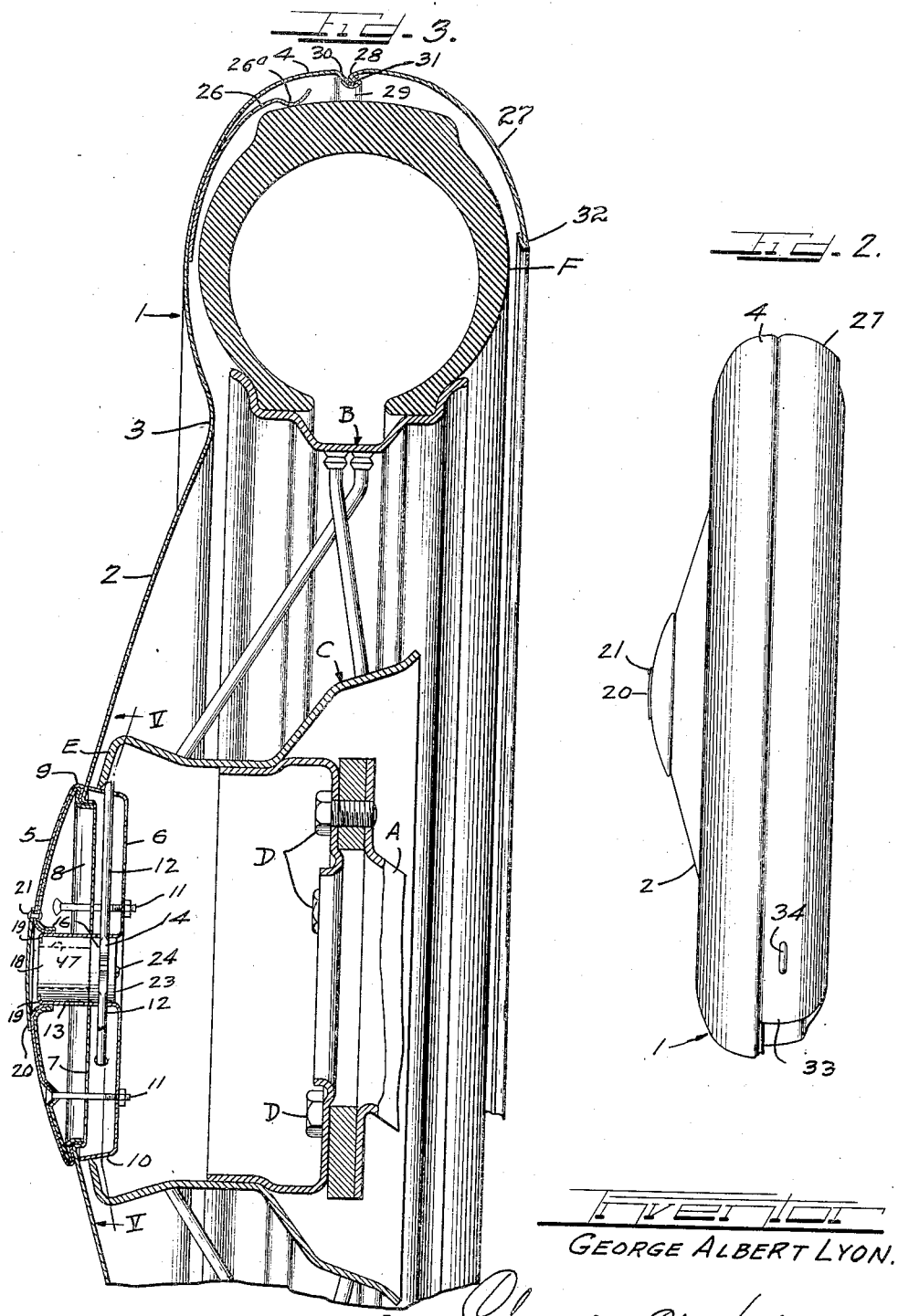

Patented Dec. 14, 1937

2,102,469

UNITED STATES PATENT OFFICE 2,102,469

TIRE COVER

George Albert Lyon, Detroit, Mich., assignor to Lyon Incorporated, Detroit, Mich., a corporation of Delaware Application August 21, 1933, Serial No. 686,027

4 Claims. (Cl. 150—54)

This invention has to do with tire covers and is concerned more particularly with a multipart tire cover and means for locking at least a part of the cover to the hub of a spare wheel carrying a spare tire.

It is an object of the invention to provide a multi-part cover with means whereby the same may be locked to the hub of a spare wheel.

It is another object of the invention to provide a tire cover with resilient means for spacing and centering the same by engagement with the tire and provide the cover with a hub lock which is centered by said resilient means to facilitate engagement for locking the cover on the tire.

It is another object of the invention to provide a multi-part cover including a member for locking one part to the hub of a spare wheel, and another part which is readily releasable and serves to assist in covering substantially the entire tread and outer side wall of the tire.

In accordance with the general features of the invention, there is provided a tire cover member in the general shape of one-half of a drum for covering the outer or front side and extending across at least a portion of the tread. This cover part is provided with key-controlled or other suitable locking instrumentalities such as a safe combination lock arranged to cooperate with an inner part of the spare wheel hub whereby to lock said part on the tire. The cover is provided with a spring means interiorly thereof arranged to slide over and onto the tread to guide said part as the same is being applied to the cover, said spring means serving to arrange the locking means so as to enable the same to readily slip into the hub for interlocking cooperation therewith. In the manufacture of tire covers of the type serving to cover the outer side wall and substantially the entire tread of spare tires, the cost of manufacture when the cover is to be made in one piece is substantially prohibitive because of the extreme metal working involved. That is, commencing with a flat piece, it is an extremely difficult if not impossible task to form an outer peripheral portion which extends at substantially right angles to the plane of the stock, that is, at substantially right angles to the median plane of the tire when the remainder of the cover extends in substantial parallelism to the median plane of the tire, since the metal is weakened to such an extent as to make the same useless, substantially, for the purpose intended.

Accordingly the invention contemplates the provision of a cover which will conceal the same portions of the tire, namely substantially the entire outer side wall and tread thereof, and yet formed without difficulty into two pieces neither of which requires excessive working or flow of the metal. Accordingly the second member of the cover comprises a resilient split ring which is readily releasable from the first member, an anti-rattling connection between the same being provided. The split member is preferably formed with hand grips so that the same may be more readily grasped for manipulation purposes than would otherwise be the case.

The first cover member when locked in position, prevents unauthorized access to the bolts or other means connected to the hub for supporting and carrying the spare wheel.

The tire cover and associated parts are largely formed of self-sustaining or form-retaining sheet material of any suitable composition, sheet metal being found very effective for the purpose.

The tire cover construction embodying the subject matter of the present invention is susceptible of being applied to an automobile or other motor vehicle body on any side or part thereof, and may be employed in conjunction with a fender well as well as in conjunction with any part of the body not affording a well.

Other objects and advantages of the invention will appear as the description proceeds.

This invention (in a preferred form) is illustrated in the drawings and hereinafter more fully described.

On the drawings:

Figure 1 is an elevational view showing the tire cover construction built in accordance with one form of the invention.

Figure 2 is an end elevation, looking from the right, of the structure shown in Figure 1.

Figure 3 is an enlarged fragmentary sectional view taken substantially in the plane designated by the line III—III in Figure 1.

Figure 4 is an enlarged fragmentary sectional view of details of the connection between the parts of the cover.

Figure 5 is a fragmentary sectional view taken substantially as indicated by the line V—V in Figure 3.

As shown on the drawings:

Referring now more particularly to the drawings, a tire carrier A, which may be secured to any part of the vehicle body, either in conjunction with or entirely separated from a well such as a fender well, is formed to support a spare wheel B through the hub C by means of bolts or the like D which are accessible for manipulation only through the opening in the front wall E of the hub.

The cover construction embodying the principles of the present invention includes a drum-like member 1 having a side part 2 shaped to conform generally to the front or outer side of the spare wheel B and spare tire F, providing an annular depression 3 arranged adjacent the rim of the wheel B, and having also a rim portion 4 extending somewhat rearwardly thereof to cover the adjacent part of the tread of the tire.

Any suitable means may be employed for locking the cover member 1 to the hub C of the wheel B. One such construction is shown in the drawings and comprises essentially a two-part housing comprising generally cup-shaped members 5 and 6 arranged substantially centrally of the cover member 1 so that when the cover member is locked to the hub, the cover member is substantially coaxially arranged with respect to the spare wheel and tire. The side part 2 of the cover member 1 is formed centrally with a depression 7 in which the reduced peripheral wall 8 of the cup member 5 is preferably snugly received. The member 5 is formed preferably with an outwardly extending flange 9 which overlies and engages the front surface of the side part 2 of the cover member 1. The other cup member 6 has a preferably frusto-conical wall 10 which extends forwardly so that its edge is engaged with the rear surface of the side part 2 of the cover member 1. Securing members of any suitable construction such as the bolts 11 pass through registering holes in the cup members 5 and 6 and the depression 7 and serve to securely hold the housing parts together.

The front cup member 5 may be of any edge contour and of any face design desired and is preferably of the same shape and design as the hub caps to be used in connection with the wheels supporting the vehicle, in order to harmonize the spare tire cover with the hub caps of the car.

The peripheral wall 10 of the rear cup member 6 is of such diameter at its juncture with the base of the cup 5, as to readily pass rearwardly through the opening in the front wall E of the hub C, and is yet of such maximum diameter as to engage the mouth of said opening with a substantially wedgelike contact. Slightly rearwardly of the line of contact between the cup member 6 and the hub C, said cup is provided with pairs of substantially radially aligned openings of such size as to permit the locking pins or latches 12 to pass therethrough, the inner opening being formed on a cylindrical forwardly projecting boss 13 of the cup 6 and being of such further size as to enable the pins 12 to swing from locking to released position and vise versa as shown in Figure 5.

The latches 12 are formed with eyes 14 at their inner ends and pivotally mounted on studs 15 connected to the rear flange 16 of the lock cylinder 17 mounted in the stationary barrel 18, the latter being held stationary by means of the inwardly extending locking tongues 19 on the sleeve or boss 13 of the cup 6. If desired a cap 20 hinged to the cup member 5 at 21 may serve to conceal the locking means and may be swung out when it is desired to insert a key in the keyhole 22 in the lock cylinder 17. It will be seen that when the proper key is inserted and the lock cylinder 17 is rotated from the position shown in Figures 3 and 5, the latches 12 will be retracted to the positions shown in dotted lines in Figure 5, thus permitting the cup member 6 to be removed from the hub C and thus permitting the cover member 1 as a whole to be removed. An assembly plate 23 holds the latches 12 in place in cooperative relation to the remaining parts of the locking mechanism, by means of a rivet or stud 24, a spacing sleeve 25 around the stud 24 between the plate 23 and flange 16 of the lock cylinder 17 serving to hold the plate 23 and flange 16 apart sufficiently to permit free pivotal movement of the latches 12 about the studs 15. When the cover member 1 is, however, locked to the hub C as shown, it provides an effective means for preventing unauthorized access to the mounting bolts D and thus effectively serves to lock the spare wheel, tire and itself on the automobile or other vehicle in connection with which the same is used.

The cover member 1 may be perforate or imperforate, as desired, the latter being, however, preferable. In mounting the cover on the tire, by moving the cover rearwardly toward the tire, it is difficult to properly register the cup member 6 with the opening in the wall E of the hub C, without some sort of centering means. For this reason, centering means such as the springs 26 are provided. Three substantially circumferentially equally spaced, springs 26 are shown, although it is to be understood that the number of springs employed may be varied so long as they are arranged to serve the function of resiliently guiding the cover member into proper centered relation to the hub C. Each spring 26 is formed preferably with a U-bend 26a forming a smooth engaging member which rides outwardly over and onto the tread of the tire as the cover member is shoved toward the tire.

It will be observed that the rim portion 4 extends only slightly across the tire tread. It has been found as a result of actual experiment and practice that, bearing the proportions shown on the drawings in mind, it is undesirable from a manufacturing and cost standpoint to form the rim so that it extends across the entire tread. The reason for this is that tire covers of the character shown are formed from a flat piece of stock and the rolling and/or stamping operations incident to such a procedure would require an excessive bending and flow of material in the bending of the outer peripheral portion to substantially a right angle to the remaining disc-like portion. It has been found considerably cheaper to form the rim portion in a plurality of parts, two being here shown as preferable. The cover part 1 and associated structure have already been described. The member forming the second rim covering part of the tire cover construction embodying the present invention is designated at 27 and comprises a split ring of preferably sheet metal having its longitudinal marginal portions turned upon itself to provide smooth edges which will not scratch the hands. The ring member 27 is formed to cover the portion of the tread which is not covered by the rim portion 4 of the cover member 1, and preferably one-half or somewhat more than one-half the tread, transversely thereof as shown in Figure 3. The rim part 4 of the cover member 1 is formed to accommodate the outer margin 28 of the ring member 27, and to this end is formed with a rounded lip 29 providing an outwardly opening annular recess or pocket 30 in which a lining 31 of cushioning material such as rubber is secured. The lining material 31 may be continuous or spaced at suitable intervals to properly prevent an actual contact between the parts 1 and 27 and thereby prevent rattling therebetween.

The lining material 31 is formed so that when the ring 27 is in proper operative relation to said lining material, the margin 28 is depressed thereinto, said material thereby engaging the marginal portion on opposite sides of its part of minimum diameter, thereby serving to effectively hold the margin in place.

The opposite margin 32 of the ring 27 is preferably of less diameter than the outer periphery of the tread of the tire so as not to pass thereacross unless the ring member 27 is expanded. To facilitate the manipulation of the member 27 to enable expansion thereof, finger grips or rings 34 are secured adjacent the ends 33 of the ring 27 as shown clearly in Figures 1 and 2. The diameter of the ring 27 at its outermost periphery is substantially the same as that of the rim portion 4 of the cover member 1, and, transversely, the ring member 27 is preferably of such curvature as to constitute substantially a continuation of the transverse contour of the cover member 1 at its rim portion 4, thus presenting the appearance of a unitary tire cover construction conforming substantially to the side wall and tread of the tire.

The ring member 27 may be applied to or removed from the cover member 1 independently of the means for locking the cover member 1 on the hub C. When the latches 12 are withdrawn by employment of the proper key in conjunction with the lock cylinder 17, the spring elements 26 still serve to hold the entire cover on the tire. However, to prevent accidental falling of the cover, after the same is unlatched, to the ground or elsewhere and thus prevent injury to the cover, the peripheral margin 32 will engage with the rear part of the tire and will not pass thereacross forwardly until the cover member 27 is expanded as by grasping the finger grips 34 and intentionally separating the ends 33 sufficiently to enable said ends to be moved forwardly clear of the tire tread. In expanding the cover member 27, if desired, the ends 33 thereof may be separated sufficiently to pass in a plane parallel to the plane of the tire, clear thereof without disturbing the cover member 1 to any appreciable extent. The method employed in removing the cover as a whole may be determined by the individual operator.

It will be seen that the cover construction provided in accordance with the principles of the present invention serves to effectively conceal the front and substantially the entire tread of a spare tire, serves also, when locked to the hub, to prevent unauthorized access to the spare wheel mounting bolts D, may be constructed without incurring the prohibitive manufacturing costs incident to the making of a single piece cover extending substantially entirely across the tread of the tire, embodies few pieces which may be readily assembled at an extremely low cost and in a minimum of time, and is such as to inhibit any rattling of the parts thereof either with one another or with any part of the spare wheel.

The tire cover construction embodying the present invention is susceptible of use with a tire carrier mounted on any part of the vehicle body such as at the rear, and may also be used in conjunction with a tire carrier mounted adjacent and for cooperation with a well such as a fender well, suitable recesses or slots being of course provided in the well to accommodate the finger grips 34. When mounted in a well, the cover ring 27 has its ends 33 disposed in the mouth of the well, and under such circumstances, when the cover member 1 is locked to the hub as above described, the ring member 27 will also be locked in position since the ends thereof are prevented from being expanded by the well itself.

I am aware that many changes may be made and numerous details of construction may be varied through a wide range without departing from the principles of this invention, and I therefore do not purpose limiting the patent granted hereon otherwise than necessitated by the prior art.

I claim as my invention:

1. In a spare wheel and tire cover assembly: a drum-like member shaped to substantially conform to the outer side of the spare wheel and spare tire carried thereby and to be shoved axially into cooperative relation thereto, resilient means carried by said member and engageable with the tread of the tire to yieldably support the member from the tire, said means being provided at a plurality of spaced points at the outer periphery of the member to hold the member in substantially coaxial relation to the tire, and locking means arranged substantially centrally of said member and formed to interlock with the wheel hub to prevent unauthorized removal of the cover, said resilient means serving to center said locking means with the hub to enable said locking means to readily interlock with said hub.

2. In combination with an automotive vehicle body provided with a carrier for a spare wheel and including mounting means accessible only from the front of the spare wheel hub: a drum-like member shaped to substantially conform to the outer side of the spare wheel and spare tire carried thereby and to be shoved axially into cooperative relation thereto, resilient means carried by said member and engageable with the tread of the tire to yieldably support the member from the tire, said means being provided at a plurality of spaced points at the outer periphery of the member to hold the member in substantially coaxial relation to the tire, and locking means arranged substantially centrally of said member and formed to interlock with the wheel hub to prevent unauthorized removal of the cover, said resilient means serving to center said locking means with the hub to enable said locking means to readily interlock with said hub, said locking means, when interlocked with the hub, being arranged to substantially prevent access to the mounting means.

3. In a spare wheel and tire cover assembly: a drum-like member shaped to substantially conform to the outer side of the spare wheel and spare tire carried thereby, an arcuate tread covering part formed for connection with said member, resilient means carried by said member and engageable with the tread of the tire to yieldably support the member from the tire, said means being provided at a plurality of spaced points at the outer periphery of the member to hold the member in substantially coaxial relation to the tire, and locking means arranged substantially centrally of said member and formed to interlock with the wheel hub to prevent unauthorized removal of the cover, said resilient means serving to center said locking means with the hub to enable said locking means to readily interlock with said hub, said locking means including a key-controlled element.

4. In combination with an automotive vehicle body provided with a carrier for a spare wheel and including mounting means accessible only from the front of the spare wheel hub: a drumlike member shaped to substantially conform to the outer side of the spare wheel and spare tire carried thereby, an arcuate tread covering part formed for connection with said member, resilient means carried by said member and engageable with the tread of the tire to yieldably support the member from the tire, said means being provided at a plurality of spaced points at the outer periphery of the member to hold the member in substantially coaxial relation to the tire, and locking means arranged substantially centrally of said member and formed to interlock with the wheel hub to prevent unauthorized removal of the cover, said resilient means serving to center said locking means with the hub to enable said locking means to readily interlock with said hub, said locking means, when interlocked with the hub, being arranged to substantially prevent access to the mounting means, said locking means including a key-controlled element.

GEORGE ALBERT LYON.